United States Patent
Yamada

(10) Patent No.: US 8,797,588 B2
(45) Date of Patent: Aug. 5, 2014

(54) PRINT INSTRUCTION DEVICE AND PRINT INSTRUCTION SYSTEM

(75) Inventor: Jun Yamada, Tajimi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 199 days.

(21) Appl. No.: 13/406,324

(22) Filed: Feb. 27, 2012

(65) Prior Publication Data

US 2012/0218605 A1    Aug. 30, 2012

(30) Foreign Application Priority Data

Feb. 28, 2011    (JP) ................................ 2011-041722
Feb. 10, 2012    (JP) ................................ 2012-027172

(51) Int. Cl.
*G06F 17/30*    (2006.01)
*G06K 15/00*    (2006.01)

(52) U.S. Cl.
USPC ........................................ 358/1.17; 358/1.14

(58) Field of Classification Search
USPC ............... 358/1.17, 1.14, 1.15, 1.18, 1.9, 2.1; 382/118; 707/999.006
See application file for complete search history.

(56) References Cited

U.S. PATENT DOCUMENTS

| | | | |
|---|---|---|---|
| 2004/0193597 A1* | 9/2004 | Johnson | 707/6 |
| 2005/0128518 A1* | 6/2005 | Tsue et al. | 358/1.15 |
| 2007/0146833 A1* | 6/2007 | Satomi et al. | 358/537 |
| 2008/0130961 A1* | 6/2008 | Kinoshita | 382/118 |
| 2009/0044714 A1* | 2/2009 | Bae et al. | 101/485 |
| 2009/0273667 A1 | 11/2009 | Nozaki et al. | |
| 2010/0014721 A1* | 1/2010 | Steinberg et al. | 382/118 |
| 2010/0053661 A1* | 3/2010 | Ushiku | 358/1.14 |
| 2010/0123918 A1 | 5/2010 | Matsuo | |
| 2010/0188704 A1* | 7/2010 | Hoarau et al. | 358/1.16 |
| 2010/0192081 A1 | 7/2010 | Inoue et al. | |
| 2011/0085710 A1* | 4/2011 | Perlmutter et al. | 382/118 |
| 2011/0181911 A1* | 7/2011 | Kojima | 358/1.15 |
| 2012/0087636 A1* | 4/2012 | Kudo | 386/241 |
| 2012/0120304 A1* | 5/2012 | Corcoran et al. | 348/349 |

FOREIGN PATENT DOCUMENTS

| | | |
|---|---|---|
| CN | 101790055 A | 7/2010 |
| JP | 2005-303754 A | 10/2005 |
| JP | 2007-058794 A | 3/2007 |
| JP | 2007-140897 A | 6/2007 |

(Continued)

OTHER PUBLICATIONS

State Intellectual Property Office of the People'S Republic of China, Notification of First Office Action for Chinese Patent Application No. 201210048077.7 (counterpart to above-captioned patent application), mailed Mar. 5, 2014.

*Primary Examiner* — Jerome Grant, II
(74) *Attorney, Agent, or Firm* — Baker Botts L.L.P.

(57) ABSTRACT

A print instruction device configured to instruct a print unit to print an image stored in an image storing unit storing a plurality of images is provided. The print instruction device comprises a display unit, an operation unit, and a controller. The controller is configured to judge whether each of the plurality of images stored in the image storing unit includes a person who is included in a past image which had been printed in the past, control the display unit to display information regarding the image which is judged to include the person who is included in the past image in a different form than information regarding the image which is judged not to include the person included in the past image, receive a selection of an image for printing through the operation unit, and instruct the print unit to print the selected image.

18 Claims, 9 Drawing Sheets

(56) References Cited

FOREIGN PATENT DOCUMENTS

| | | |
|---|---|---|
| JP | 2007-193590 A | 8/2007 |
| JP | 2007-208583 A | 8/2007 |
| JP | 2007-280291 A | 10/2007 |
| JP | 2009-104527 A | 5/2009 |
| JP | 2010-026661 A | 2/2010 |
| JP | 2010-124214 A | 6/2010 |

* cited by examiner

PRINT INSTRUCTION DEVICE AND PRINT INSTRUCTION SYSTEM

CROSS-REFERENCE TO RELATED APPLICATION

This application claims priority under 35 U.S.C. §119 from Japanese Patent Application No. 2011-041722 filed on Feb. 28, 2011, and No. 2012-027172 filed on Feb. 10, 2012. The entire subject matter of the application is incorporated herein by reference.

BACKGROUND

1. Technical Field

The following description relates to one or more techniques for enabling a user to select images to be printed easily from among a plurality of images.

2. Related Art

Conventionally, images, such as pictures taken by a digital camera, are stored in a memory of a mobile information terminal device or a memory card, and a user selects a desired image from among the stored images for printing. Recently, as a capacity of the memory is getting large, the number of images storable in the memory is increased. This requires, however, the user to perform a troublesome work of selecting images for printing from among the large number of images stored in the memory.

In order to reduce such burden to the user in performing such a troublesome work, there is proposed a technique of recognizing persons appearing in each of plurality of images with use of a facial recognition process, and selecting images in which a person, who appears most frequently through all the images, as images to be printed.

SUMMARY

However, the images in which the most frequently appearing person is included are not always the images the user desires to print. Therefore, it is desired an alternative method to lighten the troublesome work of selecting images for printing.

Aspects of the invention provide an improved technique of lightening the troublesome work of selecting images to be printed.

According to aspects of the present invention, there is provided a print instruction device configured to instruct a print unit to print an image stored in an image storing unit storing a plurality of images. The print instruction device comprises a display unit configured to display information, an operation unit configured to be operated by a user, and a controller configured to judge whether each of the plurality of images stored in the image storing unit includes a person who is included in a past image which had been printed in the past, control the display unit to display information regarding the image which is judged to include the person included in the past image in a different form than information regarding the image which is judged not to include the person included in the past image, receive a selection of an image for printing through the operation unit, and instruct the print unit to print the selected image.

According to further aspects of the invention, there is also provided a print instruction device configured to instruct a print unit to print an image stored in an image storing unit storing a plurality of images. The print instruction device comprises a display unit configured to display information, an operation unit configured to be operated by a user, and a controller configured to judge whether each of the plurality of images stored in the image storing unit includes a person who is included in a past image which had been printed in the past, control the display unit to display information regarding the image which is judged to include the person included in the past image while not to display information regarding the image which is judged not to include the person included in the past image, receive a selection of an image for printing through the operation unit, and instruct the print unit to print the selected image.

According to further aspects of the invention, there is also provided a print instruction system comprising a server and a terminal device connected to the server, configured to instruct a print unit to print an image stored in an image storing unit storing a plurality of images. The server comprises a controller configured to judge whether each of the plurality of images stored in the image storing unit includes a person who is included in a past image which had been printed in the past, and transmit a judgment result to the terminal device. The terminal device comprises a display unit configured to display information, an operation unit configured to be operated by a user, and a controller configured to receive the judgment result from the server, control the display unit to display information regarding the image which is judged to include the person included in the past image in a different form than information regarding the image which is judged not to include the person included in the past image based on the judgment result, receive a selection of an image for printing through the operation unit, and transmit a selection result to the server. Additionally, the controller of the server is further configured to receive the selection result from the terminal device, and instruct the print unit to print the selected image based on the selection result.

According to further aspects of the invention, there is also provided a print instruction system comprising a server and a terminal device connected to the server, configured to instruct a print unit to print an image stored in an image storing unit storing a plurality of images. The server comprises a controller configured to judge whether each of the plurality of images stored in the image storing unit includes a person who is included in a past image which had been printed in the past, and transmit a judgment result to the terminal device. The terminal device comprises a display unit configured to display information, an operation unit configured to be operated by a user, and a controller configured to receive the judgment result from the server, control the display unit to display information regarding the image which is judged to include the person included in the past image while not to display information regarding the image which is judged not to include the person included in the past image based on the judgment result, receive a selection of an image for printing through the operation unit, and transmit a selection result to the server. Additionally, the controller of the server is further configured to receive the selection result from the terminal device, and instruct the print unit to print the selected image based on the selection result.

According to further aspects of the invention, there is also provided a non-transitory computer readable medium having computer readable instructions stored thereon, the instructions, when executed by a computer, causing the computer to instruct a print unit to print an image stored in an image storing unit storing a plurality of images, configured to judge whether each of the plurality of images stored in the image storing unit includes a person who is included in a past image which had been printed in the past, display information regarding the image which is judged to include the person included in the past image in a different form than information regarding the image which is judged not to include the person included in the past image, receive a user selection of an image for printing, and instruct the print unit to print the selected image.

According to further aspects of the invention, there is also provided a non-transitory computer readable medium having computer readable instructions stored thereon, the instructions, when executed by a computer, causing the computer to instruct a print unit to print an image stored in an image storing unit storing a plurality of images, configured to judge whether each of the plurality of images stored in the image storing unit includes a person who is included in a past image which had been printed in the past, display information regarding the image which is judged to include the person included in the past image without displaying information regarding the image which is judged not to include the person included in the past image is not displayed, receive a user selection of an image for printing, and instruct the print unit to print the selected image.

BRIEF DESCRIPTION OF THE
ACCOMPANYING DRAWINGS

Figure 5:
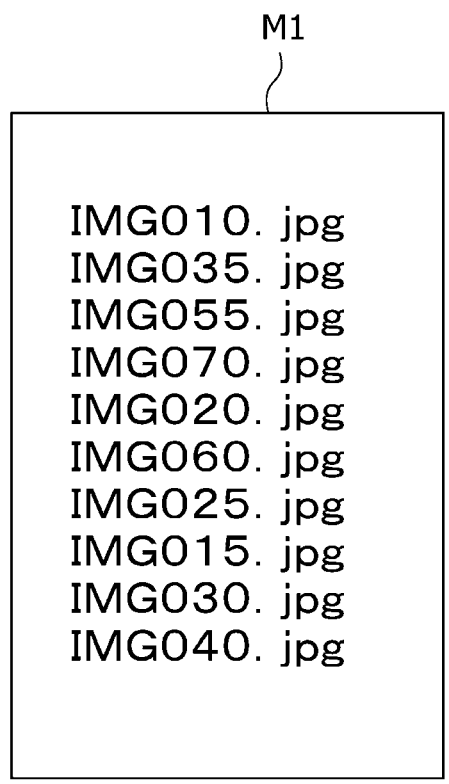

FIG. 5 schematically shows an example of an image selection screen.

Figure 6:
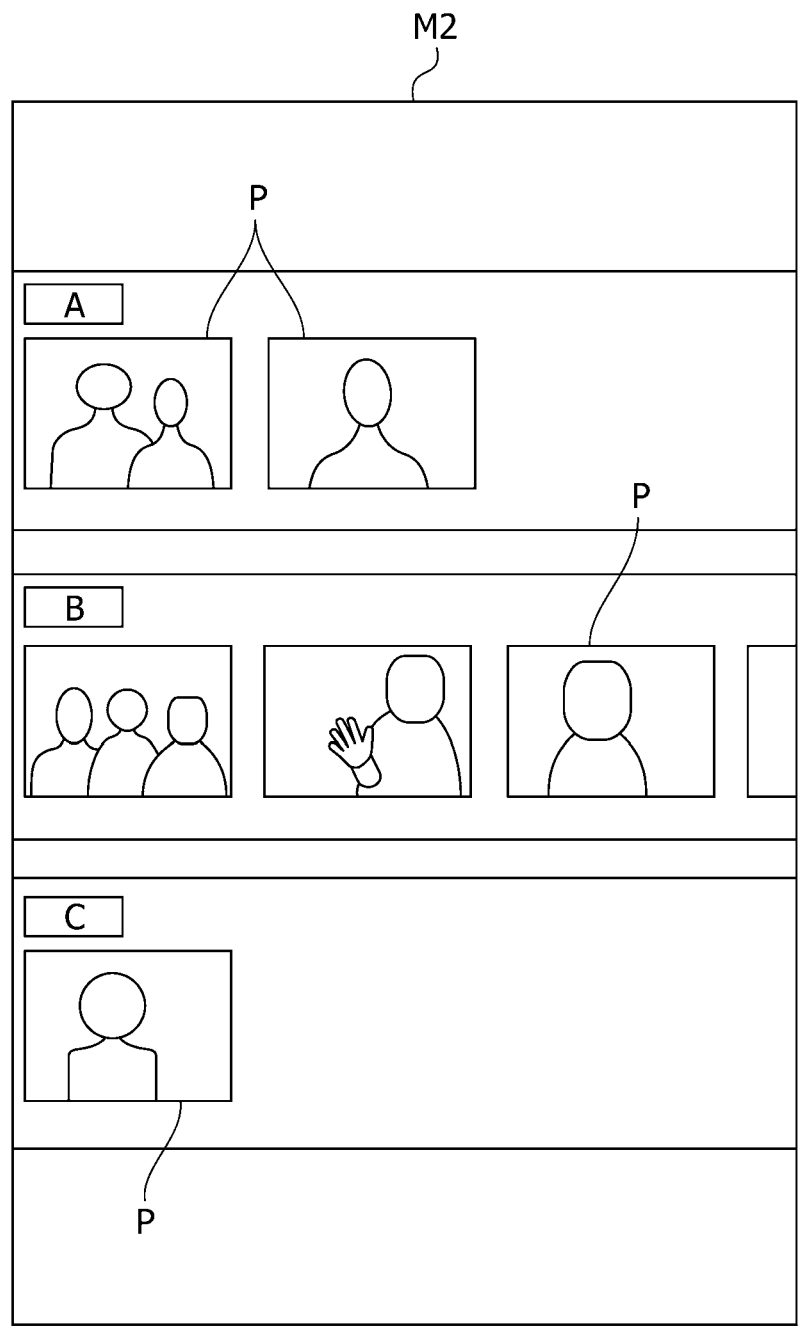

FIG. 6 schematically shows another example of the image selection screen.

Figure 7:
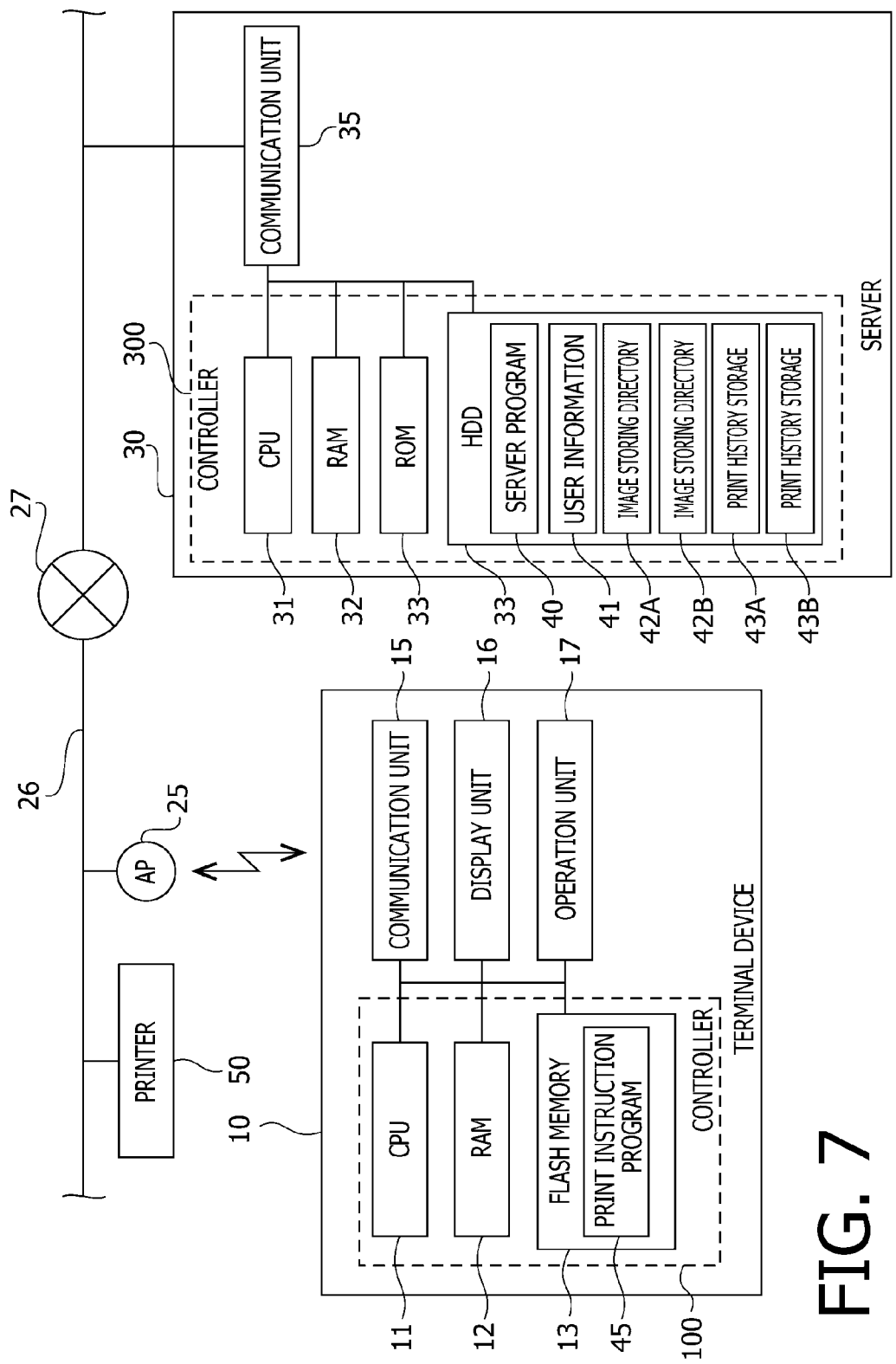

FIG. 7 is a block diagram schematically showing an overall configuration of a print instruction system including a terminal device and a server in a second embodiment of the present invention.

Figures 8A, 8B:
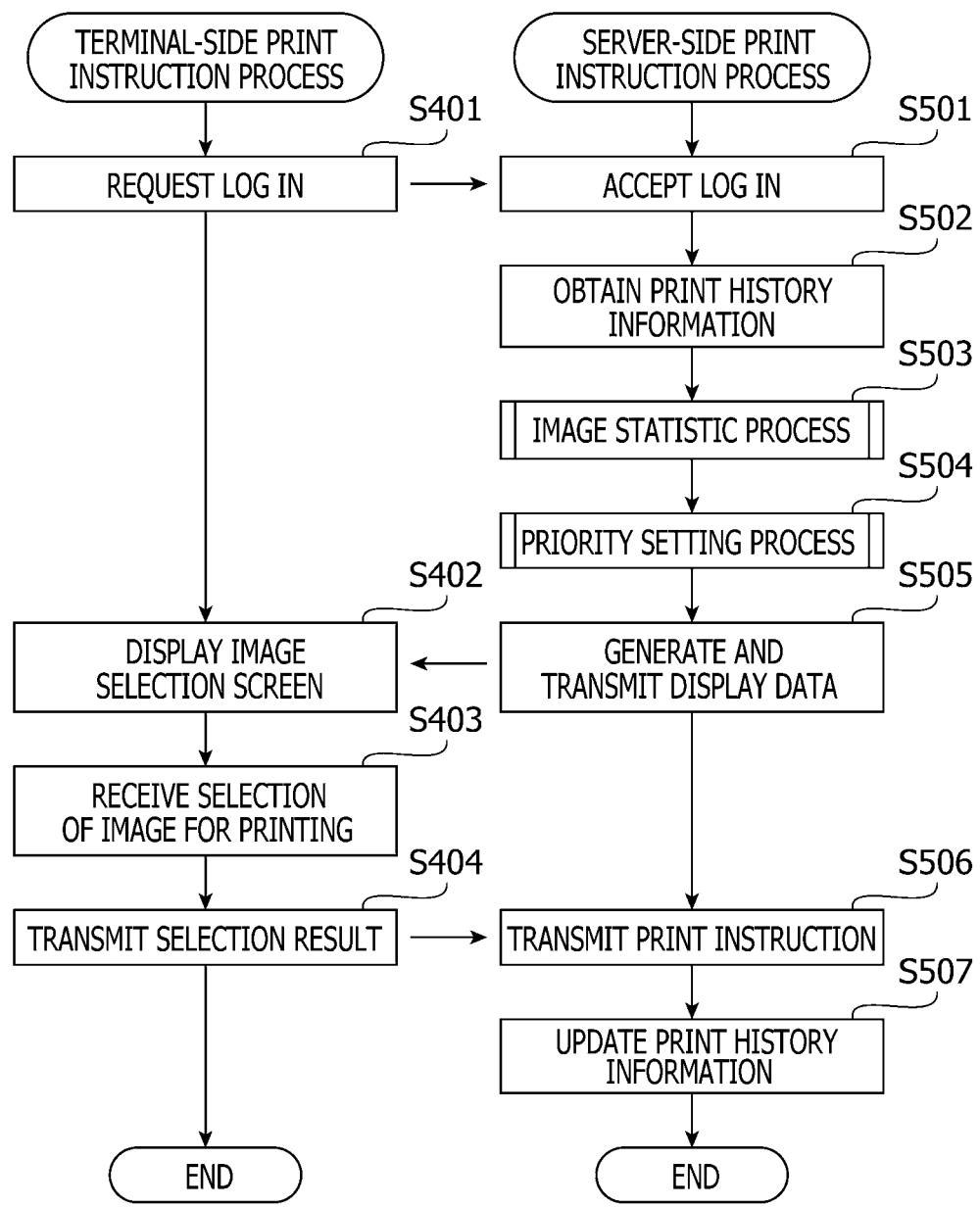

FIGS. 8A and 8B show flowcharts showing a procedure of a terminal-side print instruction process and a server-side print instruction process.

Figure 9:
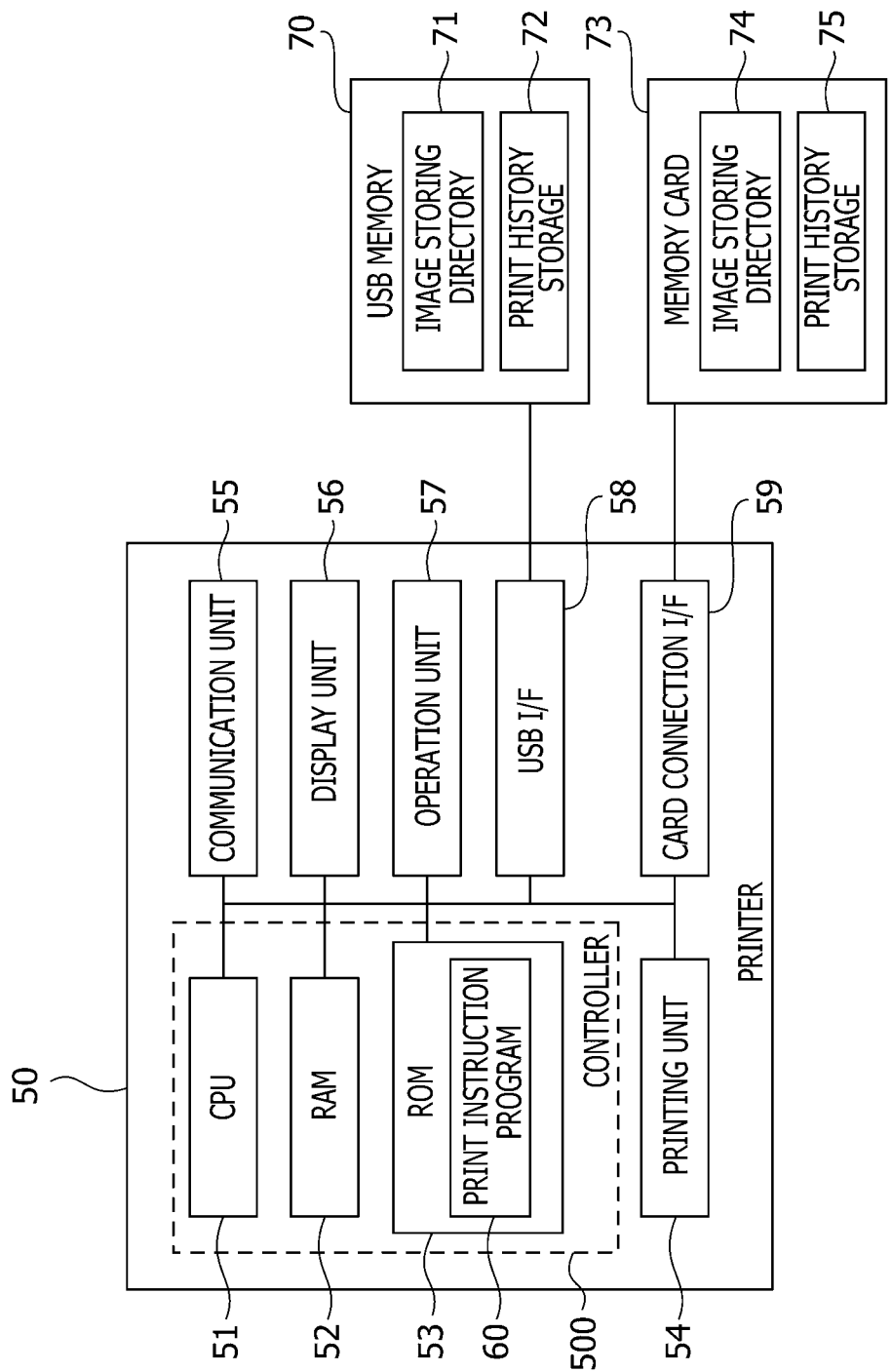

FIG. 9 is a block diagram schematically showing an overall configuration of a printer in a third embodiment according of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

First Embodiment

Hereinafter, a first embodiment according to aspects of the present invention will be described with reference to FIGS. 1 through 6.

In the first embodiment, a terminal device 10 is described as an example of a print instruction device of the present invention.

Figure 1:
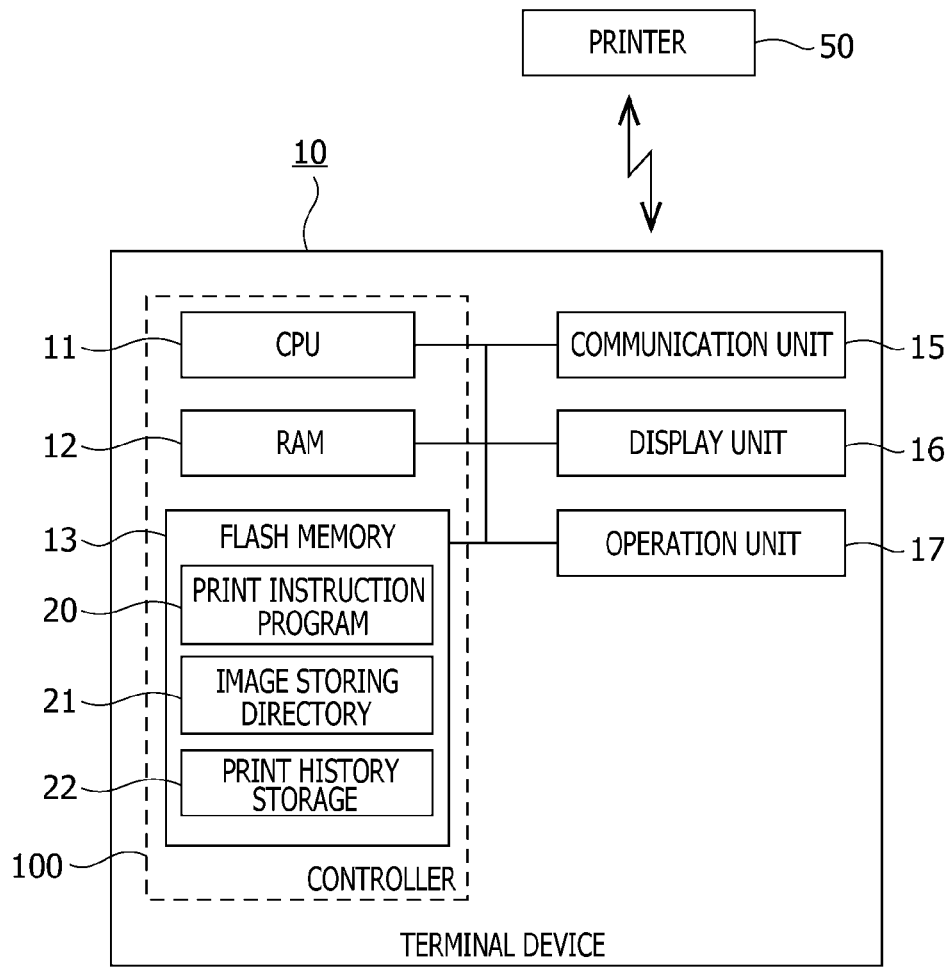
FIG. 1 is a block diagram schematically showing an overall configuration of a terminal device according to a first embodiment of the present invention.

As shown in FIG. 1, the terminal device 10, which is, for example, a mobile information terminal, is provided with a controller 100, a communication unit 15, a display unit 16 and an operation unit 17. The controller 100 includes a CPU (Central Processing Unit) 11, a RAM (Random Access Memory) 12, and a flash memory 13. The flash memory 13 is a rewritable non-volatile memory having a directory structure. The flash memory 13 stores various kinds of programs, such as an OS (Operating System), a print instruction program 20 for executing a print instruction process described later in detail, and a printer driver, etc. Additionally, the flash memory 13 contains an image storing directory 21 which is configured to store a plurality of images, and print history storage 22 which will be described later. The CPU 11 is a processor configured to load programs onto the RAM 12 to control the operations of each unit.

The communication unit 15 has a function of communicating with an external device utilizing a wireless LAN and/or Bluetooth (Trademark). In this embodiment, the communication unit 15 is configured to perform a peer to peer communication with a printer 50. The display unit 16 is configured to display images under control of the CPU 11. The operation unit 17 includes a keyboard and/or a touch panel integrated with the display unit 16, and a user can input instructions through the operation unit 17.

In the print instruction process, a plurality of pieces of information respectively representing candidate images for printing are displayed on the display unit 16. Then, a user can select desired ones from among the candidate images and input instruction to print the selected images.

Figure 2:
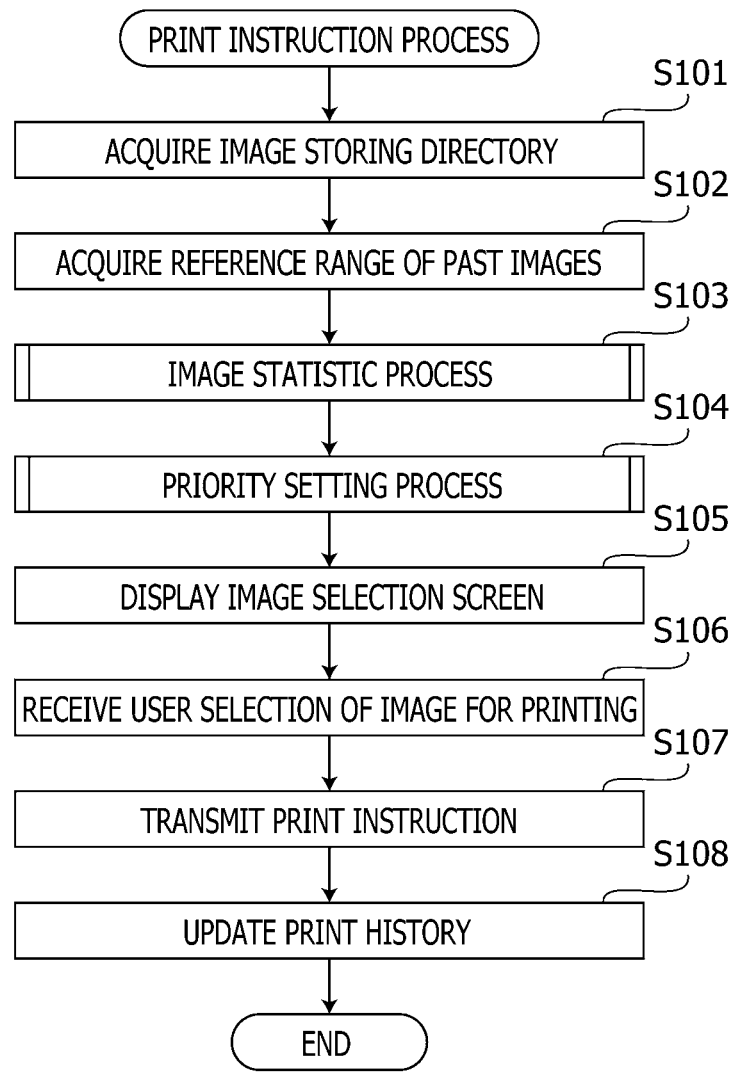
FIG. 2 is a flowchart illustrating a print instruction process.

The CPU 11 initiates the print instruction program 20 to execute the print instruction process shown in FIG. 2 in response to a user input of an instruction therefor through the operation unit 17. Initially, the CPU 11 requests a user to designate an image storing directory 21 which stores a plurality of images (S101). The user can designate, through the operation unit 17, a desired directory from among a plurality of directories configured in the flash memory 13, as the image storing directory 21.

Subsequently, the CPU 11 requests the user to designate a reference range (S102). According to the embodiment, images that had been printed within the reference range (hereinafter, referred to as "reference images") are referred to based on print history information stored in the print history storage 22 in the flash memory 13. The print history information contains, for example, an address (or a file name), the latest print date and time (hereinafter, abbreviated as "the latest print date"), the number of times of printing of each of the past images. In this embodiment, images printed in the past (hereinafter, referred to as "past images") are stored in the flash memory 13. Specifically, the past images may also be stored in the designated image storing directory 21, or in another directory in the flash memory 13.

The user may designate the reference range by specifying a period of time. In such a case, the specified period of time is regarded to define a period starting from a certain time in the past to the present, and the past images printed in the specified period are referred to. For example, if the user designates "30 days" as the period of time, the past images which have been printed within the past 30 days are selected, as the reference images, based on the print history information.

Additionally or alternatively, the user may designate the reference range by specifying the number of images. For example, if the user designates "200" as the number of images, the lately printed 200 images are selected, as the reference images, based on the print history information.

Subsequently, the CPU 11 performs an image statistic process shown in FIG. 3, in which the number of times of printing for each person included in the reference images and the latest print date for each person are obtained (S103).

Figure 3:
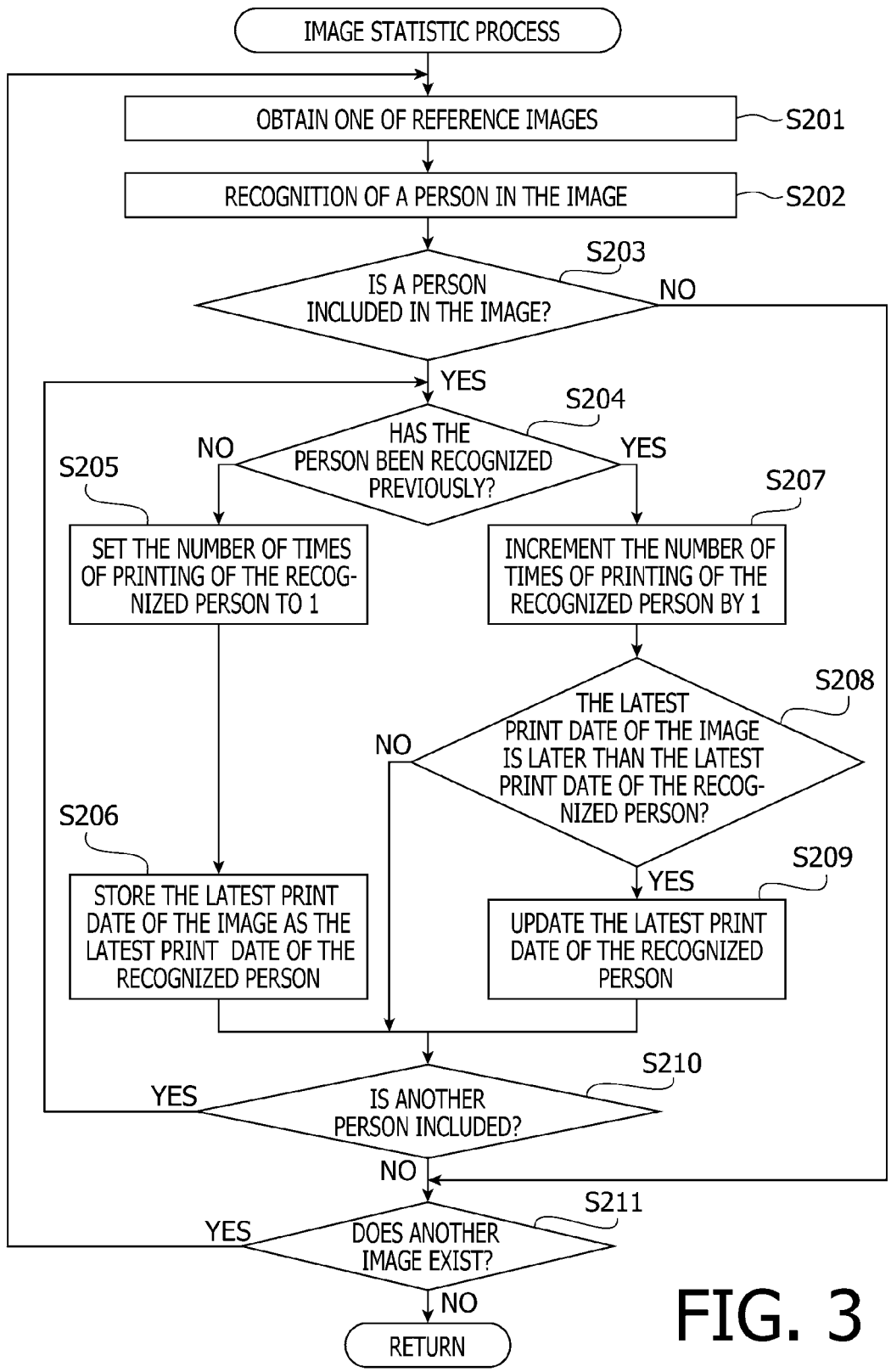
FIG. 3 is a flowchart illustrating an image statistic process.

In the image statistic process shown in FIG. 3, the CPU 11 firstly selects one of the reference images with reference to the print history information stored in the print history storage 22. Then, the CPU 11 obtains the selected image from the flash memory 13 based on the address of the selected image based on the print history information, and loads the image onto the RAM 12 (S201).

Then, the CPU 11 performs a facial recognition of each person included in the obtained image using a facial recognition technology (S202). During the facial recognition, feature amount data, which includes quantified data of a position and a shape of parts of the person (e.g., profile of the face, eye, mouth, and nose) included in the image, is obtained and each person is recognized based on the feature amount data.

After performing the facial recognition, the CPU 11 judges whether at least one person is included (i.e., recognized) in the obtained image (S203). If at least one person is included in the obtained image (S203: Yes), the CPU 11 judges whether the currently recognized person has been recognized previously (S204). If the currently recognized person has not been recognized previously (i.e., if the currently recognized person has been recognized for the first time) (S204: No), the CPU 11 defines a counter for counting the number of times of printing of the recognized person on the RAM 12 and sets the counter value to 1 (S205). Further, the CPU 11 stores the latest print date of the obtained image as a latest print date of the recognized person in the RAM 12 (S206).

If the recognized person is a person who was recognized previously (S204: Yes), the CPU 11 increments the counter for the recognized person by 1 (S207). Then, the CPU 11 judges whether the latest print date of the obtained image is later than the latest print date of the recognized person stored in the RAM 12 (S208). If the latest print date of the obtained image is later than the latest print date of the recognized person (S208: Yes), the CPU 11 updates the latest print date of the recognized person to the latest print date of the obtained image (S209). If the latest print date of the obtained image is not later than the latest print date of the recognized person (S208: No), the CPU 11 does not update the latest print date of the recognized person.

After storing or updating the latest print date in S206 or S207, or if the latest print date of the obtained image is before the latest print date of the recognized person (S208: No), the CPU 11 judges whether another person is included in the obtained image (S210). If another person is included in the obtained image (S210: Yes), the CPU 11 goes back to S204, and performs the procedure of storing or updating the number of times of printing and the latest print date for the another person.

If no other person is included in the obtained image (S210: No) or no person is recognized in the obtained image (S203: No), the CPU 11 judges whether there exists another reference image to be obtained (S211). If another reference image exists (S211: Yes), the CPU 11 goes back to S201 and repeats the procedure in the subsequent steps for the image. If there exists no reference image to be obtained (S211: No), the CPU 11 terminates the image statistic process. According to the image statistic process described above, the number of times of printing and the latest print date for each person included in the past images within the reference range are obtained and stored in the RAM 12 by the CPU 11.

In this regard, the print history information stored in the print history storage 22 may include information regarding a result of the facial recognition of a person recognized in each of the past images. For example, the print history information may include information that a certain image includes a person A, a person B, and a person C, and associated feature amount data of each person A, B and C. According to this configuration, there is no need to obtain the past images from the flash memory 13 based on the address thereof for performing the facial recognition of the person as shown in FIG. 3. In other words, the CPU 11 could obtain the number of times of printing and the latest print date for each person in the past images only by referring to the print history information stored in the print history storage 22 in the image statistic process.

Figure 4:
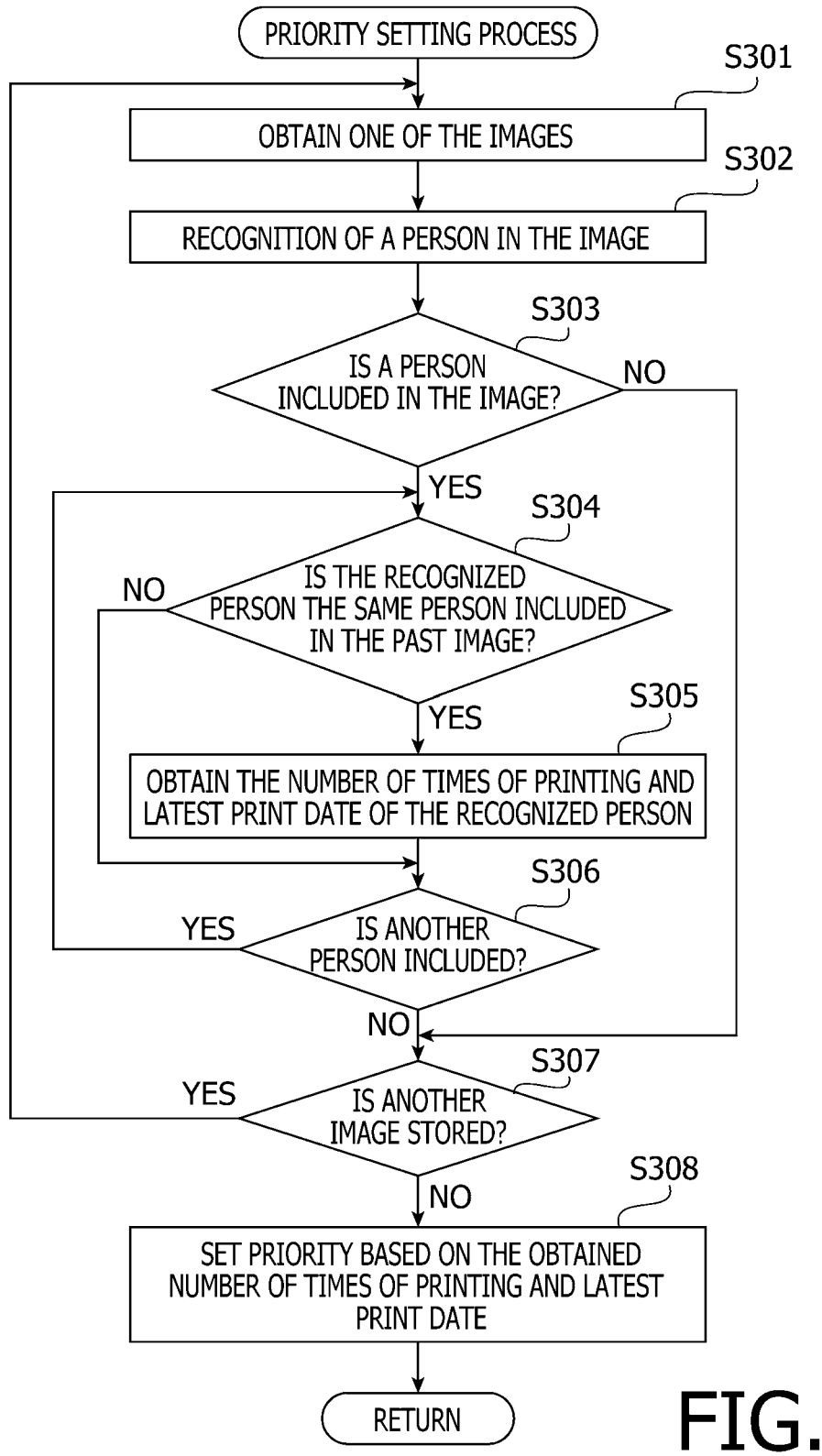
FIG. 4 is a flowchart illustrating a priority setting process.

Referring back to FIG. 2, after the image statistic process is terminated in S103, the CPU 11 performs a priority setting process shown in FIG. 4 for setting a priority of each image stored in the designated image storing directory 21 (S104).

When the priority setting process is initiated, the CPU 11 retrieves one of the images stored in the designated image storing directory 21, and loads the same onto the RAM 12 (S301). Then, the CPU 11 performs facial recognition of a person included in the obtained image with use of the facial recognition technology (S302). Subsequently, the CPU 11 judges whether at least one person is included (i.e., recognized) in the obtained image (S303). If at least one person is included in the obtained image (S303: Yes), the CPU 11 judges whether the recognized person is the same person included in the past images (i.e., the person recognized in the image statistic process) (S304).

If the recognized person is the same person included in the past image(s) (S304: Yes), the CPU 11 obtains the number of times of printing and the latest print date of the person with reference to the result of the image statistic process, and stores them in the RAM 12 in association with the obtained image (S305). If the recognized person is not the same person included in the past images (S304: No), the CPU 11 does not obtain the number of times of printing or the latest print date of the person.

Subsequently, the CPU 11 judges whether another person is included in the obtained image (S306). If another person is included in the obtained image (S306: Yes), the CPU 11 goes back to S304, and repeats the procedure for the newly found person.

If no other person is included in the obtained image (S306: No), or if no person is recognized in the obtained image (S303: No), the CPU 11 judges whether another image to be obtained is stored in the image storing directory 21 (S307). If another image is stored in the image storing directory 21 (S307: Yes), the CPU 11 goes back to S301 to obtain the image and performs the same procedure.

If no other image is stored in the image storing directory 21 (S307: No), the CPU 11 sets priority to each image in the image storing directory 21 based on the number of times of printing and the latest print date stored in association with the each image (S308). The priority is used for determining an order or an arrangement of information representing each image when displayed on an image selection screen M1 or M2 which will be described later.

In the priority setting process, the priority can be set based on various criteria. Basically, the priority is set such that the latest print date of the image including a person is later, the priority thereof is higher. If a plurality persons included in one image, the priority is set based on the latest one of the latest print dates. Additionally or alternatively, the priority may be set so that the image including a person of which the number of times of printing is larger, the priority of such an image is higher. If a plurality persons included in one image, the priority is set based on a total number obtained by summing the numbers of times of printing for each person included in the image. Further, the priority may be set based on the number of times of printing of the person included in the images firstly. Then, if there are a plurality of images of which the number of times of printing of the person included therein is the same, the latest print date of the person included in those images are compared, and the priority of the image of which the latest print date of the person is the latest is set to be higher than the other images. Incidentally, the priority is not set to an image which does not include a person included in the past image since the number of times of printing and the latest print date are not obtained therefrom.

Referring back to FIG. 2, after the priority is set for each image in S104, the CPU 11 generates display data to display information representing each image based on the priority. Then, the CPU 11 controls the display unit 16 to display the image selection screen M1 or M2 for allowing the user to select an image to be printed based on the display data (S105). For example, the information representing the image is a file name of the image or a reduced image (e.g., thumbnail) of the image.

FIG. 5 shows an example of the image selection screen M1. On the image selection screen, a list of image file names aligned in order of the priority is displayed. In the image selection screen M1, file names corresponding to images to which the priority has not been set (since the image does not include the person included in the past image) is not displayed even if such images are stored in the designated image storing directory 21. When the user selects one of the file names on the image selection screen M1, the image or reduced image corresponding to the selected file name may be displayed on the display unit 16.

FIG. 6 shows an example of the image selection screen M2 which displays reduced images P of the images to which the priority has been set, by arranging the reduced images in three groups A, B and C. The groups A, B and C corresponds to a group of images including a person A, a group of images including a person B, and a group of images including a person C, respectively. In the image selection screen M2, the groups are arranged in order of the number of times of printing of the person included in the images, where the number of times of printing of the person A, B, and C is 100 times, 50 times and 30 times, respectively. Additionally, in the each group, the image having a high priority (e.g., the latest print date is more recent) is located on a left side while the image having a low priority is located on a right side.

Incidentally, in the image selection screen M2, reduced images corresponding to images to which the priority has not been set (since the image does not include the person included in the past image) is not displayed even if the images are stored in the designated image storing directory 21.

The user can select at least one of the images for printing based on the information displayed on the image selection screen M1 or M2 through the operation unit 17. The CPU 11 receives the selection of the image for printing from the user (S106), generates print data based on the selected image, and transmits the print data with print instruction to the printer 50 through the communication unit 15 (S107). The printer 50 prints the image on a sheet based on the print data in response to receiving the print instruction from the terminal device 10.

Subsequently, the CPU 11 updates the print history information in the print history storage 22 (S108). In this regard, if the print history information of the selected image is not stored in the print history storage 22, such print history information is newly generated and stored in the print history storage 22. Specifically, a file name or an address of the image is newly stored in the print history storage 22, the current date and time is set as the latest print date, and the number of times of printing of the image is set to 1. On the other hand, if the print history information of the selected image has been stored in the print history storage 22, the CPU 11 updates the latest print date to the current date and time and increments the number of times of printing by 1.

As described above, the feature amount data may be included in the print history information stored in the print history storage 22. In this case, if the print history information of the selected image is not included in the print history storage 22, the CPU 11 stores the person recognized in the selected image and the feature amount data thereof in association each other in addition to newly stored file name or the address, latest print date, and number of times of printing of the selected image. Then, the CPU 11 terminates the print instruction process.

According to the first embodiment, it is judged whether each image, which is candidate for printing, includes a person included in the past images, and if the image includes the person included in the past images, the information presenting such an image is displayed in a different form than the information presenting the image which does not include a person included in the past images. Then, in response to receiving a selection of an image for printing by the user based on the displayed information, the print instruction for printing the selected image can be made.

Generally, the image including a person included in the past image is likely to be selected for printing than the image which does not include the person included in the past image. Therefore, by displaying the information of the former in a different form than the information of the latter, the time-consuming work to select the image for printing by the user can be reduced.

Additionally, in the first embodiment, when the print instruction is made for the selected image, print history information for identifying the selected image is generated and stored in the print history storage 22, and the recognition of a person included in the past image is performed based on the print history information in the print history storage 22. Then, it is judged whether the each image which is a candidate for printing includes a person included in the past image based on the recognized person included in the past image.

Additionally, in the first embodiment, when the print instruction is made for the selected image, the print history information including information for identifying the person included in the selected image is generated and stored in the print history storage 22. Then, it is judged whether the each image which is a candidate for printing includes a person included in the past image based on the print history information in the print history storage 22. According to this configuration, the loads for the process can be reduced compared with a case where the recognition of a person is performed based on the past images. Additionally, the process can be performed without obtaining and loading the past images.

Additionally, in the first embodiment, at least one of images which have been printed in a certain period of time or a certain number of images printed in the past is designated as the reference range by the user. Then, the image statistic process is performed for the images within the designated reference range, and the priority for each images are set based on the result of the image statistic process. Generally, it is deemed that the images including a person printed recently is more likely to be selected for printing than the images including a person printed earlier. Therefore, according to this configuration, the priority which reflects the recent trend can be set for each image.

Additionally, in the first embodiment, the priority is set based on the number of times of printing and the latest print date of the person included in each image, and the information presenting each image is displayed in order of the priority. According to this configuration, it is easy for the user to select an image for printing.

Additionally, in the first embodiment, the information presenting an image which does not include a person included in the past image is not displayed. According to this configuration, the number of pieces of information to be displayed is reduced and the user can select an image to be printed easily.

Further, by utilizing the facial recognition technique for recognizing a person in the images, a judgment whether to include a person or not can be performed appropriately.

Second Embodiment

Subsequently, in the present embodiment, a second embodiment according to aspects of the present invention will be described with reference to FIGS. 7 and 8. In the second embodiment, a print system including the terminal device 10 and a server 30 is described as an example of a print instruction system of the present invention.

As shown in FIG. 7, the terminal device 10 of this embodiment has the same configurations as the terminal device 10 shown in FIG. 1, except that the flash memory 13 does not contain the image storing directory and the print history storage. Therefore, the same reference numbers are put to the same configurations and the explanations thereof are omitted partially.

The flash memory 13 in the terminal device 10 stores a print instruction program 45 to execute a terminal-side print instruction process as described later in detail. The communication unit 15 is configured to connect the terminal device 10 to a network line 26, such as intranet, etc., via an access point 25. The printer 50 is also connected to the network line 26, and the network line 26 is connected to an external network 27, such as internet, etc.

The server 30 is provided with a controller 300 comprising a CPU 31, a RAM 32, a ROM 33, and an HDD (hard disk drive) 34, and a communication unit 35. The HDD 34 stores various kinds of programs such as an OS and a server program 40 to execute a server-side print instruction process described later in detail. The CPU 31 loads the programs onto RAM 32 to execute them. Additionally, the HDD 34 stores user information 41 including a user name and a password for each of a plurality of users using the server 30, image storing directories 42A and 42B and print history storage 43A and 43B for each user registered in the user information.

FIGS. 8A and 8B respectively show flowcharts of the terminal-side print instruction process executed by the terminal device 10 and the server-side print instruction process executed by the server 30.

When the user instructs to initiate the print instruction program 45 in the terminal device 10 to execute the terminal-side print instruction process, the CPU 11 transmits a login request to the server 30 (S401). The login request transmitted by the terminal device 10 includes a user name and a password which have been registered in the server 30 in advance.

The CPU 31 in the server 30 initiates the server-side print instruction process in response to receive the login request from the terminal device 10. The CPU 31 judges whether the user name and the password included in the login request match those in the user information, and when the judgment result is positive, allows the terminal device 10 to login the server 30 (S501). Then, the CPU 31 reads the print history information stored in the print history storage 43A corresponding to the user name from the HDD 34 and loads it onto the RAM 32 (S502). It is noted that, in this embodiment, the print history storage 43A and the image storing directory 42A correspond to the user who has been allowed to login while the print history storage 43B and the image storing directory 42B correspond to the other user. Incidentally, the image storing directory may be identified depending on the user, and the print history information corresponding to the identified image storing directory may be loaded for the process.

Subsequently, the CPU 31 performs the aforementioned image statistic process based on the print history information stored in the print history storage 43A for obtaining the number of times of printing and the latest print date for each person included in the past images (S503). In this regard, the reference range of the past images may be designated by the user of the terminal device 10. Alternatively, the images which have been printed in a predetermined period of time, which starts from a certain time in the past to the present or a predetermined number of images which have been printed lately may be set as the reference range. Further, the whole past images of which print history information is stored in the print history storage 43A may be obtained for the image statistic process without setting the reference range.

Subsequently, the CPU 31 performs the aforementioned priority setting process for each image stored in the image storing directory 42A based on the number of times of printing and the latest print date obtained by the image statistic process (S504).

Then, the CPU 31 generates display data for displaying information presenting each image based on the priority set by the priority setting process and transmits the display data to the terminal device 10 through the communication unit 35 (S505). The CPU 11 of the terminal device 10 displays the image selection screen M1 or M2 including information presenting the each image on the display unit 16 based on the received display data (S402).

The display data generated by the CPU 31 includes at least information regarding a result of the judgment whether the person included in the past image is included in each image in S304. The display data may include information regarding a result of the priority setting. For example, in order to display the image selection screen M1 shown in FIG. 5, the CPU 31 generates and transmits display data including at least a list of file names of the images in order of the priority. For another example, in order to display the image selection screen M2 shown in FIG. 6, the CPU 31 generates and transmits display data including at least the images or reduced images thereof and information regarding display position of such images or reduced images.

The server 30 may have a function as Web server, and the print instruction program 45 may be executed as web browser by the terminal device 10. In this regard, the CPU 31 of the server 30 generates a Web page as the display data and transmits the same to the terminal device 10.

When the user selects an image for printing on the image selection screen M1 or M2 through the operation unit 17, the CPU 11 transmits a selection result to the server 30 through the communication unit 15 (S404). Then, the CPU 11 terminates the terminal-side print instruction process.

When the CPU 31 of the server 30 receives the selection result from the terminal device 10, the CPU 31 generates print data based on the selection result, and transmits the print data with print instruction to the printer 50 through the communication unit 35 (S506). The printer 50 prints the image on a sheet based on the print data in response to receiving the print instruction from the server 30.

Subsequently, the CPU 31 updates the print history storage 42A according to the result of the printing (S507), and terminates the server-side print instruction process.

As described above, in the second embodiment, the server 30 identifies a user of the terminal device 10, and performs the server-side print instruction process based on the print history information corresponding to the identified user. According to this configuration, the image selection screen which is suitable for each user can be displayed.

Additionally, in the second embodiment, the server 30 identifies a directory which stores the images, and performs the server-side print instruction process based on the print history information corresponding to the identified directory. According to this configuration, the image selection screen which is suitable for each directory can be displayed.

Third Embodiment

Subsequently, a third embodiment according to aspects of the present invention will be described with reference to FIG. 9. In the third embodiment, the printer 50 is described as an example of a print instruction device of the present invention.

As shown in FIG. 9, the printer 50 is provide with a controller 500, a printing unit 54, a communication unit 55, a display unit 56, an operation unit 57, a USB interface 58, and a card connection interface 59. The controller 500 comprises a CPU 51, a RAM 52, and a ROM 53. The ROM 53 stores various kinds of program, such as a print instruction program 60. The CPU 51 is a processor configured to load the programs read from the ROM 53 onto the RAM 52 to execute the same.

The USB interface 58 is configured to connect with an external storing media such as a USB memory 70, etc. The USB memory 70 stores an image storing directory 71 and a print history storage 72. The card connection interface 59 is configured to connect with an external storing media such as a memory card 73, etc. The memory card 73 stores an image storing directory 74 and a print history storage 75.

The printer 50 performs a print instruction process in a similar way as described in FIG. 2. Specifically, when a user connects the USB memory 70 with the USB interface 58, for example, and instructs to execute the print instruction process, the CPU 51 reads the print history information stored in the print history storage 72 in the USB memory 70 and performs the image statistic process based on the print history information.

Subsequently, the CPU 51 performs the priority setting process for the images stored in the image storing directory in the USB memory 70 based on a result of the image statistic process, and display the image selection screen M1 or M2 on the display unit 56 based on the priority set in the priority setting process. When the user selects an image for printing through the operation unit 57, the CPU 51 obtains the selected image from the image storing directory 71 in the USB memory 70. Then, the CPU 51 generates print data based on the obtained images and send the same with a print instruction to the printing unit 54. The printing unit 54 prints the image on a sheet based on the print data. Subsequently, the CPU 51 updates the print history information in the print history storage 72 of the USB memory 70 based on a result of the printing, and terminates the print instruction process.

Alternatively, when the memory card 73 is connected with the card connection interface 59, the CPU 51 performs the print instruction process similarly to the above based on the image storing directory 74 and print history storage 75 stored in the memory card 73.

As described above, in the present embodiment, an external storing medium which stores images for printing is connected and identified, and the print instruction process is performed based on the print history information stored in the external storing medium. According to this configuration, the image selection screen which is suitable for each external storing medium can be displayed.

Modified Examples

It is to be understood that the subject matter defined in the appended claims is not necessarily limited to the embodiments described in the above paragraphs and appended figures. For example, various kinds of modified examples described below may fall within the spirit and scope of the invention as set forth in the appended claims.

(1) In the above embodiments, the facial recognition technique is used for recognizing a person included in the image. However, the recognition may be performed by registering a name of a person included in the image as EXIF (Exchangeable Image File Format) information by a user in advance and recognizing a person included in the images with reference to the EXIF information. Additionally, it is applicable to store information regarding a result of the image statistic process (i.e., the number of times of printing and the latest print date) into the past image itself and to refer the information for the recognition.

(2) It is applicable to store the feature amount data, which is obtained by the recognition of the person included in the image, in association with the name of the person inputted by the user. The name may be displayed in the image selection screen M1 or M2 with respect to the image in which the person corresponding to the name is included.

(3) In the above embodiments, the priority of each image is set based on the number of times of printing or the latest print date of a person included in each image. However, the priority of each image may be set based on the number of times of printing and the latest print date of the obtained image. Further, the priority of each image may be set based on a frequency of printing of the image in a predetermined period of time. For example, when the predetermined period of time is to "past one week," the number of times of printing of the image within the past one week is calculated and determined as the frequency of printing.

(4) In the above embodiments, the information presenting the images which do not include the person included in the past image is not displayed in the image selection screen. However, such information may be displayed in a different form than the information presenting the images which include the person included in the past image. For example, the file names of the images may be displayed in different color, or the reduced images of the images may be displayed in separated positions. Additionally, the information presenting the images which do not include the person included in the past image may be displayed emphatically, such as only the file names of those images are thickened or the reduced images of those images are displayed with thick frames.

(5) In the above embodiments, the information presenting the images which include the person included in the past image is displayed in order of the priority. However, it is not limited to display the information in that manner. For example, the information may be displayed in order of the file name with a mark indicating the priority added by the information so that the user could know the priority.

(6) A manner of setting the priority and the display format can be suitably modified. For example, the images including the person included in the past image may be divided into more than one group based on the latest print date and the number of times of printing of the person included in the image. Then, the information presenting the image may be displayed in separated portions or in different colors depending on the group.

(7) The display format of the image selection screen may be switchable in response to a user instruction. For example, a display format in which the information is displayed in order of the priority and a display format in which the information is displayed not in order of the priority may be switchable.

(8) The print instruction process may be performed for all images stored in the image storing directory, or for a part of the images stored in the image storing directory. Further, the print instruction process may be performed for all images stored in a subordinate directory of the image storing directory, or only for images directory under the image storing directory.

(9) The print history information stores at least information for identifying a person included in the past image and the information can be suitably modified. For example, only the feature amount data, or the past image itself can be stored as the print history information. Further, the print history information that a predetermined period of time has passed since it was registered in the print history storage can be deleted.

(10) In the above embodiments, the print instruction process is performed by the controller comprising the CPU and memory, but at least a part of the steps may be executed by a plurality of controllers or a dedicated processing circuit such as an ASIC.

What is claimed is:

1. A print instruction device configured to instruct a print unit to print an image stored in an image storing unit storing a plurality of images, the print instruction device comprising:
a display unit configured to display information;
an operation unit configured to be operated by a user; and
a controller configured to:
judge whether each of the plurality of images stored in the image storing unit includes a person who is included in a past image which had been printed in the past;
set priority to each of the plurality of images which is judged to include the person included in the past image, based on at least one of:
a number of times of printing of the person included in the image;
the latest print date and time of the person included in the image;
a number of times of printing of the image;
the latest print date and time of the image; and
a frequency of printing of the image in a predetermined period of time;
control the display unit to display information regarding the image which is judged to include the person included in the past image in order of the priority and in a different form than information regarding the image which is judged not to include the person included in the past image;
receive a selection of an image for printing through the operation unit; and
instruct the print unit to print the selected image.

2. The print instruction device according to claim 1, wherein the controller is further configured to generate and store print history information including information for identifying the selected image into a history storing unit when the controller instructs to print the selected image, and wherein the controller judges whether each of the plurality of images stored in the image storing unit includes the person included in the past image based on the print history information.

3. The print instruction device according to claim 2, wherein the print history information further includes information for identifying a person included in the selected image.

4. The print instruction device according to claim 1, wherein the controller is further configured to receive a designation of a reference range from the user, the reference range being specified as a period of time defining a period starting from a certain time in the past to the present, and/or being specified as a number of images printed lately, and
wherein the controller judges whether each of the plurality of images stored in the image storing unit includes the person included in the past image within the reference range.

5. The print instruction device according to claim 1, wherein the controller is further configured to perform facial recognition of the person included in each of the plurality of images, and
wherein the controller judges whether each of the plurality of images stored in the image storing unit includes the person included in the past image based on the facial recognition of the person.

6. A print instruction device configured to instruct a print unit to print an image stored in an image storing unit that stores a plurality of images, the print instruction device comprising:
a display unit configured to display information;
an operation unit configured to be operated by a user; and
a controller configured to:
judge whether each of the plurality of images stored in the image storing unit includes a person who is included in a past image which had been printed in the past;
set priority to each of the plurality of images which is judged to include the person included in the past image, based on at least one of:
a number of times of printing of the person included in the image;
the latest print date and time of the person included in the image;
a number of times of printing of the image;
the latest print date and time of the image; and
a frequency of printing of the image in a predetermined period of time;
control the display unit to display information regarding the image which is judged to include the person included in the past image in order of the priority while not to display information regarding the image which is judged not to include the person included in the past image;
receive a selection of an image for printing through the operation unit; and
instruct the print unit to print the selected image.

7. The print instruction device according to claim 6, wherein the controller is further configured to generate and store print history information including information for identifying the selected image into a history storing unit when the controller instructs the print unit to print the selected image, and wherein the controller judges whether each of the plurality of images stored in the image storing unit includes the person included in the past image based on the print history information.

8. The print instruction device according to claim 7, wherein the print history information further including information for identifying a person included in the selected image.

9. The print instruction device according to claim 6, wherein the controller is further configured to receive a designation of a reference range from the user, the reference range being specified as a period of time defining a period starting from a certain time in the past to the present, and/or being specified as a number of images printed lately, and
wherein the controller judges whether each of the plurality of images stored in the image storing unit includes the person included in the past image within the reference range.

10. The print instruction device according to claim 6, wherein the controller is further configured to perform facial recognition of the person included in each of the plurality of images, and
wherein the controller judges whether each of the plurality of images stored in the image storing unit includes the person included in the past image based on the facial recognition of the person.

11. A print instruction system comprising a server and a terminal device connected to the server, configured to instruct a print unit to print an image stored in an image storing unit storing a plurality of images,
the server comprising a controller configured to:
   judge whether each of the plurality of images stored in the image storing unit includes a person who is included in a past image which had been printed in the past; and
   transmit a judgment result to the terminal device;
the terminal device comprising:
   a display unit configured to display information;
   an operation unit configured to be operated by a user; and
   a controller configured to:
      receive the judgment result from the server;
      control the display unit to display information regarding the image which is judged to include the person included in the past image in a different form than information regarding the image which is judged not to include the person included in the past image based on the judgment result;
      receive a selection of an image for printing through the operation unit; and
      transmit a selection result to the server,
wherein the controller of the server is further configured to:
   receive the selection result from the terminal device; and
   instruct the print unit to print the selected image based on the selection result.

12. The print instruction system according to claim 11, wherein the controller of the server is further configured to:
   identify a user of the terminal device; and
   generate and store print history information including information for identifying the selected image into a history storing unit for each user, when the controller instructs to print the selected image, and
wherein the controller of the server judges whether each of the plurality of images stored in the image storing unit includes the person included in the past image based on the print history information corresponding to the identified user.

13. The print instruction system according to claim 11, wherein the controller of the server is further configured to:
   identify a directory which stores the plurality of images in the image storing unit; and
   generate and store print history information including information for identifying the selected image into a history storing unit for each directory, when the controller instructs to print the selected image, and
wherein the controller of the server judges whether each of the plurality of images stored in the image storing unit includes the person included in the past image based on the print history information corresponding to the identified directory.

14. A print instruction system comprising a server and a terminal device connected to the server, configured to instruct a print unit to print an image stored in an image storing unit storing a plurality of images,
the server comprising a controller configured to:
   judge whether each of the plurality of images stored in the image storing unit includes a person who is included in a past image which had been printed in the past; and
   set priority to each of the plurality of images which is judged to include the person included in the past image, based on at least one of:
      a number of times of printing of the person included in the image;
      the latest print date and time of the person included in the image;
      a number of times of printing of the image;
      the latest print date and time of the image; and
      a frequency of printing of the image in a predetermined period of time and
   transmit a judgment result and a priority setting result to the terminal device;
the terminal device comprising:
   a display unit configured to display information;
   an operation unit configured to be operated by a user; and
   a controller configured to:
      receive the judgment result and the priority setting result from the server;
      control the display unit to display information regarding the image which is judged to include the person included in the past image in order of the priority while not to display information regarding the image which is judged not to include the person included in the past image based on the judgment result;
      receive a selection of an image for printing through the operation unit; and
      transmit a selection result to the server,
wherein the controller of the server is further configured to:
   receive the selection result from the terminal device; and
   instruct the print unit to print the selected image based on the selection result.

15. The print instruction system according to claim 14, wherein the controller of the server is further configured to:
   identify a user of the terminal device; and
   generate and store print history information including information for identifying the selected image into a history storing unit for each user, when the controller instructs to print the selected image, and wherein the controller of the server judges whether each of the plurality of images stored in the image storing unit includes the person included in the past image based on the print history information corresponding to the identified user.

16. The print instruction system according to claim 14, wherein the controller of the server is further configured to:
identify a directory which stores the plurality of images in the image storing unit; and
generate and store print history information including information for identifying the selected image into a history storing unit for each directory, when the controller instructs to print the selected image, and
wherein the controller of the server judges whether each of the plurality of images stored in the image storing unit includes the person included in the past image based on the print history information corresponding to the identified directory.

17. A non-transitory computer readable medium having computer readable instructions stored thereon, the instructions, when executed by a computer, causing the computer to instruct a print unit to print an image stored in an image storing unit storing a plurality of images, configured to:
judge whether each of the plurality of images stored in the image storing unit includes a person who is included in a past image which had been printed in the past;
set priority to each of the plurality of images which is judged to include the person included in the past image, based on at least one of:
a number of times of printing of the person included in the image;
the latest print date and time of the person included in the image;
a number of times of printing of the image;
the latest print date and time of the image; and
a frequency of printing of the image in a predetermined period of time;
display information regarding the image which is judged to include the person included in the past image in order of the priority and in a different form than information regarding the image which is judged not to include the person included in the past image;
receive a user selection of an image for printing; and
instruct the print unit to print the selected image.

18. A non-transitory computer readable medium having computer readable instructions stored thereon, the instructions, when executed by a computer, causing the computer to instruct a print unit to print an image stored in an image storing unit storing a plurality of images, configured to:
judge whether each of the plurality of images stored in the image storing unit includes a person who is included in a past image which had been printed in the past;
set priority to each of the plurality of images which is judged to include the person included in the past image, based on at least one of:
a number of times of printing of the person included in the image;
the latest print date and time of the person included in the image;
a number of times of printing of the image;
the latest print date and time of the image; and
a frequency of printing of the image in a predetermined period of time;
display information regarding the image which is judged to include the person included in the past image in order of the priority without displaying information regarding the image which is judged not to include the person included in the past image;
receive a user selection of an image for printing; and
instruct the print unit to print the selected image.

* * * * *